United States Patent [19]
Grantham et al.

[11] Patent Number: 4,998,179
[45] Date of Patent: Mar. 5, 1991

[54] CAPACITIVE SEMICONDUCTIVE SENSOR WITH HINGED DIAPHRAGM FOR PLANAR MOVEMENT

[75] Inventors: Daniel H. Grantham, Glastonbury; James L. Swindal, East Hampton, both of Conn.

[73] Assignee: United Technologies Corporation, Hartford, Conn.

[21] Appl. No.: 317,236

[22] Filed: Feb. 28, 1989

[51] Int. Cl.⁵ .................................................. H01G 7/00
[52] U.S. Cl. ........................................ 361/283; 73/724
[58] Field of Search .................. 361/283; 73/718, 724; 29/25.42

[56] References Cited

U.S. PATENT DOCUMENTS

| | | | |
|---|---|---|---|
| 4,405,970 | 9/1983 | Swindal et al. | 361/283 |
| 4,415,948 | 11/1983 | Grantham et al. | 361/283 |
| 4,586,109 | 4/1986 | Peters et al. | 361/283 |
| 4,609,966 | 9/1986 | Kuisma | 361/283 |

FOREIGN PATENT DOCUMENTS

| | | |
|---|---|---|
| 0059488 | 7/1978 | European Pat. Off. |
| 82103121 | 6/1982 | European Pat. Off. |
| 90300743.3 | 3/1990 | European Pat. Off. |
| 127637 | 6/1987 | Japan .................. 73/718 |

Primary Examiner—Donald A. Griffin

[57] ABSTRACT

A semiconductive sensor or transducer (100), for example, a pressure sensor utilizing capacitance variations to sense pressure variations, of the silicon-on-silicon type, in which a "hinge" (111A) in the form of a relatively thin, encircling area is provided at the outer peripheral edge of the diaphragm, causing the central region (117) of the diaphragm (111) to move in a linear, non-curved or planar manner (compare FIG. 2 to FIG. 1), providing a linear response or frequency output. A first embodiment (FIG. 3) of the hinged silicon-on-silicon capacitive pressure sensor, which is basically cylindrical in shape, has the hinge formed by etching, milling or machining away some of the thickness of the diaphragm at its outer peripheral edge. In a second embodiment (FIG. 4) the hinge is formed by etching away some of the thickness of the diaphragm at its outer peripheral edge and using a glass layer to control the etching using a selective chemical enchant which is selective for silicon but does not attack the glass; while a third embodiment (FIG. 5) uses aluminum in place of the glass. In a fourth embodiment (FIG. 6) the hinge is formed effectively on the opposite side of the diaphragm from the shown in the embodiments of FIGS. 3-5. The hinge structure can be used in other forms of semiconductive transducers, which use the relative movement of a semiconductive diaphragm with respect to another semiconductive layer or substrate.

14 Claims, 3 Drawing Sheets

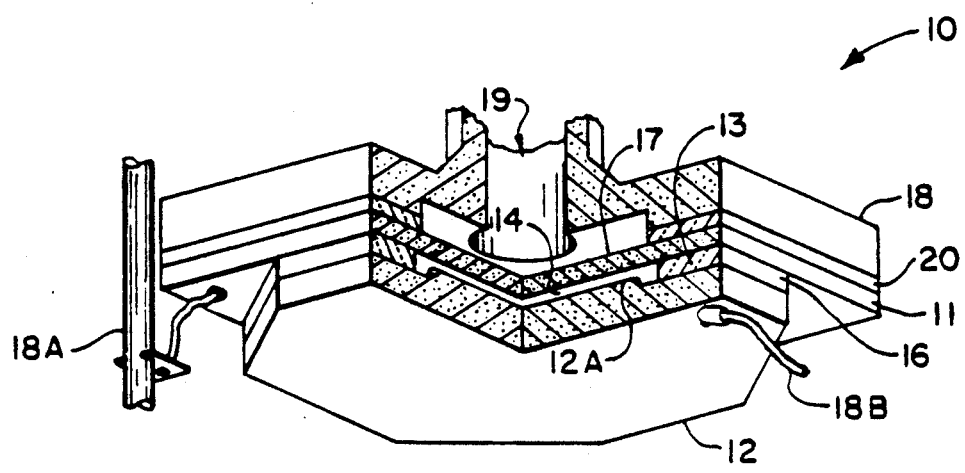
FIG. IA
PRIOR ART

CAPACITIVE SEMICONDUCTIVE SENSOR WITH HINGED DIAPHRAGM FOR PLANAR MOVEMENT

REFERENCE TO RELATED APPLICATIONS

This application relates to some of the same subject matter as one or more of the following, co-pending applications filed on Dec. 30, 1988, the disclosures of which are incorporated herein by reference:

Ser. No. 07/292,282, entitled "Capacitive Pressure Sensor With Minimized Dielectric Drift" by R. H. Bullis, J. L. Swindal, W. J. Wiegand, C. Brahm & H. Meyer; and Ser. No. 07/292,276, entitled "Capacitive Pressure Sensor With Encircling Third Plate" by D. H. Grantham & M. Latina.

TECHNICAL FIELD

This invention relates to sensors or transducers, such as, for example, pressure sensors utilizing capacitance variations to sense pressure variations, and more particularly the present invention relates to, for example, silicon-on-silicon pressure sensor designs which employ a silicon diaphragm, the movement of which due to changes in pressure varies the capacitance of the sensor and thus provides an output representative of the applied pressure. Even more particularly, the present invention relates to the providing of "hinges" in the form of reduced thicknesses toward the peripheral or outer edges of the silicon diaphragm in such sensors to provide linear response with planar movement of the central region of the diaphragm.

BACKGROUND ART

Capacitive, semiconductive sensors or transducers, used, for example, for sensing pressure or acceleration or other physical phenomenon, are known.

For example, capacitive pressure sensors are well known and are employed in capacitance transducers, microphones, rupture discs, resonators, vibrators and like devices. Many of the applications for such capacitive pressure sensors require that the sensors be extremely small, for example, of the order of eight millimeters by eight millimeters (8 mm × 8 mm).

Silicon capacitive pressure transducers are known in the art. For example, U.S. Pat. No. 3,634,727 to Polye discloses one type in which a pair of centrally apertured, conductive silicon plates are joined together with a eutectic metal bond, such that the silicon disc plates flex with applied pressure, changing the capacitance of the aperture interstice and providing a capacitive-type signal manifestation of pressure magnitude. This form of pressure transducer thus relies on the pressure-induced deflection of a thin diaphragm, in which the diaphragm deflection as a function of fluid pressure causes a variation in the distance between a pair of surfaces which effectively form the plates of a variable capacitor. Other examples of such silicon pressure sensors or transducers are included in the U.S. patents listed below.

Thus, capacitive pressure sensors are well known and are employed in capacitance transducers, microphones, rupture discs, resonators, vibrators and like devices. Some of the capacitive pressure sensors require that the sensors be extremely small, for example, of the order of about eight millimeters by eight millimeters (8 mm × 8 mm) or less and are typically made in a silicon-glass-silicon sandwich design.

An exemplary prior art, silicon-glass-silicon pressure sensor design of the sandwich type is illustrated in FIG. 1A. Such a sensor or transducer 10, which typically is generally square in its exterior configuration but often at least generally and preferably circular or cylindrical in shape for its inner, operative substructure, generally as can be seen in FIG. 1A, includes an upper, conductive, square, flexible, appropriately doped, silicon diaphragm 11 and a lower or bottom, conductive, appropriately doped, silicon base or substrate 12 with a non-conductive dielectric layer and spacer 13 (made of, for example, borosilicate glass) between them.

A closed, evacuated, hermetically sealed, reference cavity, chamber or interstice 14 is formed between the two silicon layers 11, 12. The chamber 14 is typically at a zero pressure or vacuum, or can be sealed at a higher reference pressure, at which reference level the diaphragm 11 is parallel to the silicon substrate 12, with typically a two micrometer spacing between the two.

A centrally located, typically circular pedestal or mesa 12A extends into the typically generally cylindrical, closed chamber 14 with a thin, insulating layer of glass covering the top of the mesa. The circular mesa 12A serves as a counter-electrode to the deformable capacitor plate or diaphragm 11.

The mesa 12A extends up from the main surface of the silicon substrate 12 an exemplary six and a half micro-meters, while having an exemplary diameter of one hundred and fifty thousandths (0.150") of an inch.

For further general background information on the exemplary application for the present invention, namely, in the design of the peripheral areas of the diaphragm 11 of the pressure sensor 10, it is noted that the wall(s) 16 might typically have a horizontal, lateral or radial thickness of, for example, thirty-six thousandths (0.036") of an inch with a height of, for example, nine (9) micrometers, while the separately applied, insulating, mesa layer of glass is only about a half a micrometer thick.

The silicon diaphragm 11 and the silicon base 12 may typically be square [with corners removed for the purpose of providing access for electrical contacts to the layer(s), as illustrated], having a horizontal length of an exemplary two hundred an sixty thousandths (0.260") of an inch on an edge, while the spacer wall 16 can have an inner diameter of an exemplary one hundred and ninety thousandths (0.190") of an inch. The outer, side surface of the wall spacer 16 can either follow the basic square configuration of the silicon layers or have an outer circular configuration.

It should be understood that the simplified FIG. 1A hereof for practical purposes of illustration is not at all to relative scale, as the glass wall or spacer 13/16 is only typically nine micrometers high, in contrast to the thicknesses of the silicon layers 11 & 12, which typically are eight thousandths (0.008") of an inch and fifty thousandths (0.050") inches thick, respectively, for an exemplary fifty (50 psi) pounds per square inch pressure measuring unit.

Additionally, for still further general background purposes, it is noted that an exemplary, prior art, three plate, silicon-glass-silicon (SGS) device is particularly described in assignee's U.S. Pat. No. 4,467,394 of Grantham & Swindal, the inventors hereof, issued Aug. 21, 1984.

Some exemplary, prior art, U.S. Pat. Nos. in the field of capacitive pressure sensors or transducers, including the '394 patent, all owned by the assignee hereof, are listed below:

| U.S. Pat. No. | Title | Inventors | Issue Date |
| --- | --- | --- | --- |
| 4,530,029 | Capacitive Pressure Sensor With Low Parasitic Capacitance | C. D. Beristain | 07/16/85 |
| 4,517,622 | Capacitive Pressure Transducer Signal Conditioning Circuit | B. Male | 05/14/85 |
| 4,513,348 | Low Parasitic Capacitance Pressure Transducer and Etch Stop Method | D. H. Grantham | 04/23/85 |
| 4,467,394 | Three Plate Silicon-Glass-Silicon Capactive Pressure Transducer | D. H. Grantham J. L. Swindal | 08/21/84 |
| 4,463,336 | Ultra-Thin Microelectronic Pressure Sensors | J. F. Black T. W. Grudkowski A. J. DeMaria | 07/31/84 |
| 4,415,948 | Electrostatic Bonded, Silicon Capacitive Pressure Transducer | D. H. Grantham J. L. Swindal | 11/15/83 |
| 4,405,970 | Silicon-Glass-Silicon Capacitive Pressure Transducer | J. L. Swindal D. H. Grantham | 09/20/83 |

In state of the art pressure sensors for aerospace applications, a linear frequency output from the unit is useful for interfacing with data management computers and controls units. However, such a linear response is not obtained with simple diaphragm structures, such as those of the prior art. Consequently, calibrations for the sensor must be stored in computer memory.

In the relatively simple diaphragm structures of the prior art used for capacitive pressure sensing, the capacitance changes in a non-linear fashion with change in pressure, because the central region 17 of the flexed diaphragm 11 being moved under external pressure assumes a curved shape (note FIG. 1) and moves in a non-planar manner. The result is that the frequency output desired (which is inversely proportional to the capacitance; f=1/C) is not linear in pressure.

To overcome this problem of sensor non-linearity, the present invention teaches a method and structural approach for linearizing the frequency output as a function of pressure.

Although it has been suggested to provide a "hinge" in association with a diaphragm in silicon pressure sensors, noting, for example, assignee's U.S. Pat. No. 4,513,348 of Grantham, such used solely a glass dielectric as the hinging medium, which is not as satisfactory as the use of silicon as at least the primary, if not sole, medium, as in the present invention.

DISCLOSURE OF INVENTION

Thus, in the present invention the sensor's frequency output is linearized as a function of pressure or other physical phenomenon, in the relative movement of the semiconductive diaphragm with respect to an opposed semiconductive base layer or substrate, which movement varies the capacitance between the two. In the present invention, the diaphragm is configured to include a thin, annular hinged region, in which the bending of the diaphragm takes place, and, if the center of the diaphragm is chosen to be thick enough to prevent bending in the center, then the deflection is planar and proportional to pressure or movement or other appropriate physical change, and the capacitance (inversely proportional to the distance between the plates) becomes a reciprocal linear function of the difference between the un-deflected plate separation and the plate deflection under pressure.

The annular hinged region can be produced in the silicon diaphragm by any of a number of methods—chemical etching, ion beam milling, electric discharge machining, and others. The attachment of the diaphragm to the base can be achieved by electrostatic bonding to a glass surface, fusion bonding or other means. Several configurations of the sensor with a hinged diaphragm are possible, with four exemplary ones being described below.

Although a pressure sensor represents the preferred application of the invention, the principles of the hinge structure and methodology of the present invention can be used in other forms of semiconductive transducers, such as for further example, an accelerometer, which likewise uses the relative movement of a semiconductive diaphragm with respect to another semiconductive layer or substrate to measure acceleration.

Other features and advantages will be apparent from the specification and claims and from the accompanying drawings, which illustrate several exemplary embodiments of the invention and which use like reference numbers for analogous parts.

BRIEF DESCRIPTION OF DRAWINGS

FIG. 1A is a perspective, partially cut-away view of a silicon-on-silicon, two plate capacitive pressure sensor of the prior art, which has some common structural and operational characteristics as the sensor of the present invention, and provides general background for the present invention.

MODES FOR CARRYING OUT THE INVENTION

Figure 1:
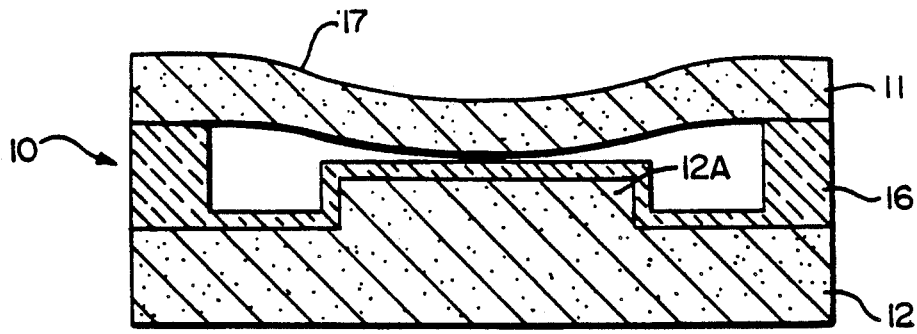
FIGS. 1 & 2 are simplified, side views of the semiconductive sensors of the prior art approach and the hinged approach of the invention, respectively, contrasting the planar movement of the central region of the hinged diaphragm of the invention (the latter) with the non-planar movement of the prior art, which non-planar causes the central region of the diaphragm to become curved and distorted, producing a non-linear, relatively complex, frequency response curve.
Figure 2:
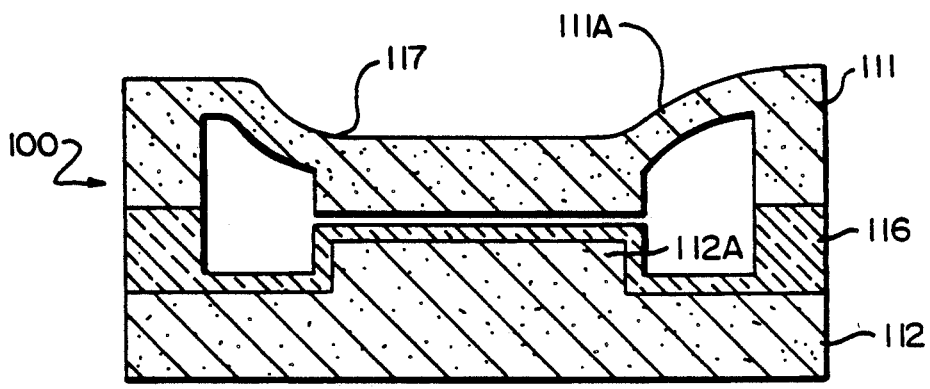

In contrast to the curved or non-planar, distorted deflection of the diaphragm 11 of the prior art shown in FIG. 1 as can be seen in FIG. 2, in the exemplary sensor 100 of the present invention the diaphragm 111 in its central region 117 remains planar as it moves relatively linearly toward the mesa plate 112A on the substrate or base 112. The thinner, peripheral "hinge" areas 111A deform, allowing the main, central region 117 to move linearly, while maintaining its planarity with respect to the upper surface of the mesa 112A.

As is true of most designs, the mesa 112A is provided on the interior facing side of the semiconductive substrate 112 extending into the closed and evacuated reference chamber formed between and within the confines of the base 112, the diaphragm 111 and the side wall(s) 116. The hinge 111A preferably has the same lateral configuration as the mesa 112A (typically circular) with their peripheries preferably coextensive, that is, with the inner periphery of the hinge preferably lying above the outer periphery of the mesa.

The hinge 111A is preferably provided in the form of a continuous, circular, indented trough, substantially decreasing the effective thickness of the preferably disc-shaped diaphragm 111 at the hinge areas in comparison to its thickness at its central region 117. The relative thicknesses of the two should have a ratio of the thickness of the central region to the hinge thickness of about ten to one (10:1).

Several exemplary embodiments of the invention will now be described with reference to FIGS. 3-6. However it is noted that, because there are many similarities, if not identity, between various analogous parts which bear analogous reference numbers, all of the various parts will not be described in detail for the sake of brevity, but only the differences discussed.

Figure 3:
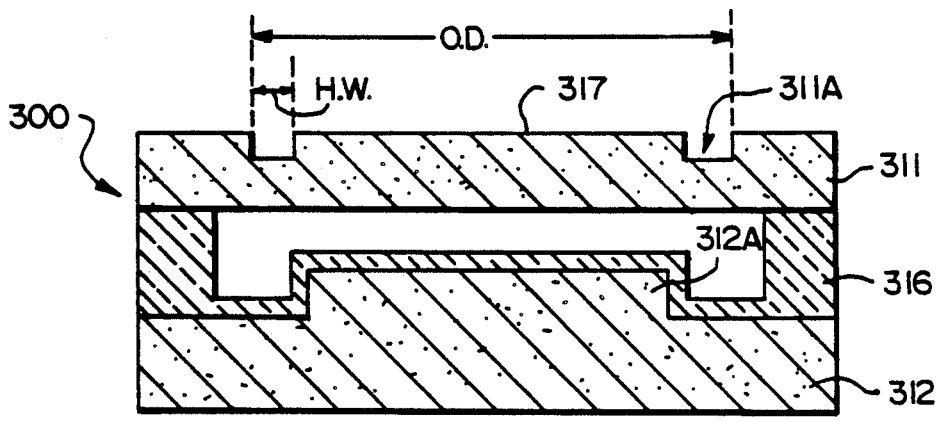
FIG. 3 is a side, simplified view of a first exemplary embodiment of the hinged silicon-on-silicon capacitive pressure sensor of the present invention, which is basically cylindrical in shape and in which the hinge is formed by etching, milling or machining away some of the thickness of the diaphragm at its outer peripheral edge.

With reference to FIG. 3, the reduced thickness area 311A, the hinge, which extends circularly around the outer areas of the diaphragm 311, may be integrally formed by etching the silicon material with known chemical formulations, by ion milling through suitably patterned masks, or by electric discharge machining (EDM).

The central region 317 of the diaphragm 311 is chosen to be thick enough, so that the pressures for which the sensor 300 is designed produce no significant bending in the central region, while the hinge 311A is thin enough to be deflected by the applied pressure in the range of interest. For an exemplary pressure sensor for zero to fifty pounds per square inch pressure 50 psi), exemplary dimensions for the doped silicon diaphragm 311 are outlined below:

| | |
|---|---|
| outer diameter ("O.D.") | 0.190" |
| hinge width ("H.W.") | 0.020" |
| thickness of central region (317) | 0.025" |
| hinge or outer area thickness (311A) | 0.003" |

Figure 4:
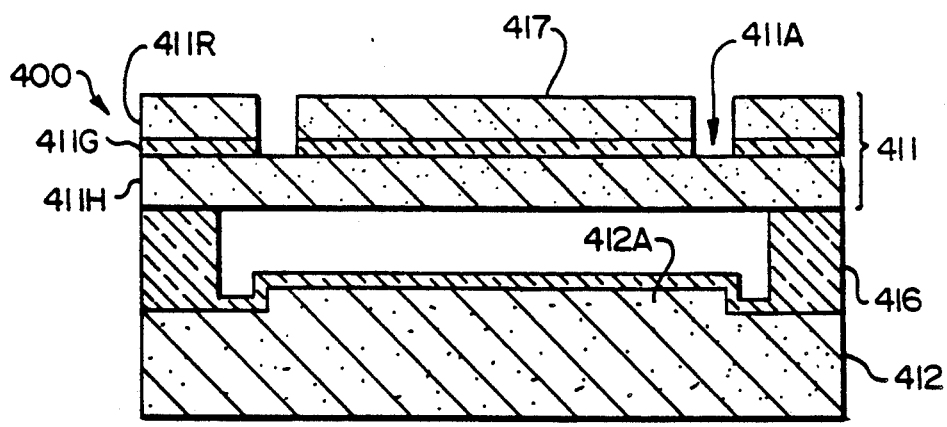
FIG. 4 is a side, simplified view of a second exemplary embodiment of the hinged silicon-on-silicon capacitive pressure sensor of the present invention, which is basically cylindrical in shape and in which the hinge is formed by etching away some of the thickness of the diaphragm at its outer peripheral edge and using a glass layer to control the etching using a selective chemical enchant which is selective for silicon but does not attack the glass.

With reference to FIG. 4, the hinge area 411A can be formed using reactive ion etching with chlorine chemistry, which is selective for silicon and does not attack glass. The composite, three layer structure of silicon-glass-silicon, which forms the diaphragm 411, is fabricated by depositing glass 411G on one silicon slice 411H chosen to be of the desired hinge thickness and electrostatically bonding it to a second silicon slice 411R thick enough to serve as the non-deflecting region 417 in combination with layers 411G & 411H.

Figure 5:
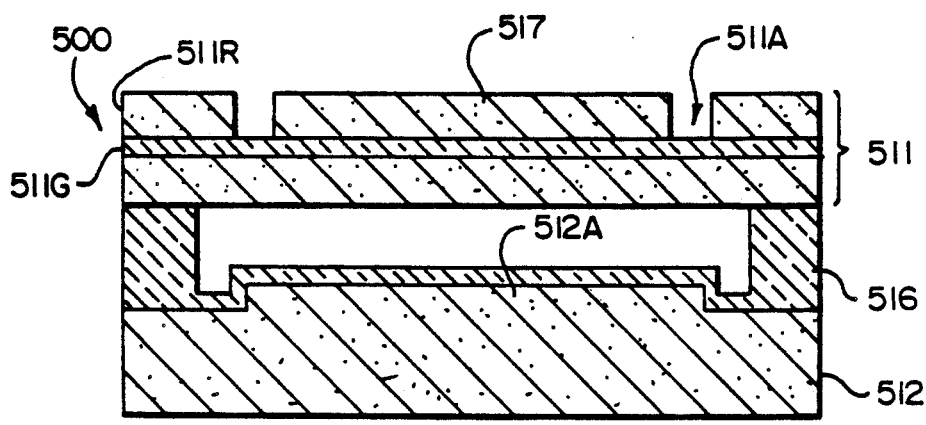
FIG. 5 is a side, simplified view of a third exemplary embodiment of the hinged silicon-on-silicon capacitive pressure sensor of the present invention, which is substantially the same as FIG. 4, but with using aluminum in place of the glass as a bonding medium and an etch stop.

With reference to FIG. 5, aluminum can be substituted for the glass 411G of FIG. 4 to serve as a bonding medium and an etch stop. After depositing the aluminum layer 511G on the hinge slice 511H, it is bonded to the thick slice 511R for rigidity. The upper silicon layer 511R is etched to produce the hinge 511A, with the aluminum layer acting as an etch stop for thickness definition and then heated to diffuse the aluminum into the silicon. Standard electrostatic assembly bonding follows.

Figure 6:
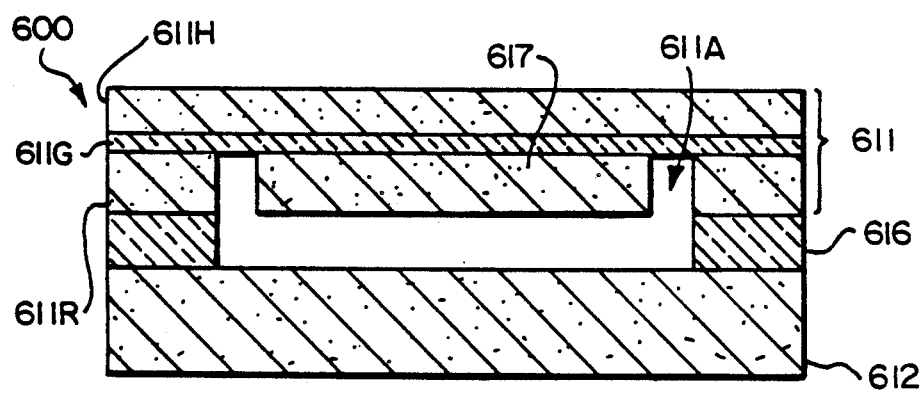
FIG. 6 is a side, simplified view of a fourth exemplary embodiment of the hinged silicon-on-silicon capacitive pressure sensor of the present invention, which is basically cylindrical in shape and in which the hinge is formed effectively on the opposite side of the diaphragm from that shown in the embodiments of FIGS. 3-5.

With reference to FIG. 6, the diaphragm structures of FIGS. 1, 2 and 3, particularly the latter two, are effectively inverted with the central region 617 protruding into the reference cavity, thus eliminating the need for the mesa structures (312A/412A/512A) shown in those figures. Alignment is simplified and, indeed, the entire structure can be made simpler by depositing the glass for the electrostatic bond on the diaphragm 611 instead of on the base 612.

The planarity of the diaphragm movement for the sensors 300/400/500/600 will be analogously the same as that shown for sensor 100 of FIG. 2, with sensor 300 being virtually identical to sensor 100.

Although this invention has been shown and described with respect to detailed, exemplary embodiments thereof, it should be understood by those skilled in the art that various changes in form, detail, methodology and/or approach may be made without departing from the spirit and scope of this invention.

For example, for further enhanced linearity, a third, encircling plate could be included in the dielectric layer (316/416/516/616), as detailed in the above identified, co-pending application Ser. No. 07/292,276.

Having thus described at least one exemplary embodiment of the invention, that which is new and desired to be secured by Patent is claimed below.

We claim:

1. In a capacitive semiconductor sensor for pressure sensing and the like, including
    a conductive substrate of semiconductor material;
    a conductive diaphragm of semiconductor material, said diaphragm having an inner, central region and an outer area, said diaphragm being capable of flexing movement in its central region due to the action of physical changes to be sensed; and
    a non-conductive, dielectric layer between the semiconductive substrate and the semiconductive diaphragm, said layer providing peripheral wall(s) extending between and joining said semiconductive substrate and said semiconductive diaphragm; an evacuated reference chamber being formed between said semiconductive substrate and said semiconductive diaphragm and being closed off by said peripheral wall(s) formed by said dielectric layer between said semiconductive substrate and said semiconductive diaphragm; the flexing movement of said semiconductive diaphragm due to the physical changes, causing the capacitance of the sensor to vary; the improvement comprising:

a "hinge" provided at the outer, peripheral area of said diaphragm, said hinge including an area surrounding said central region of substantially less thickness than the thickness of the central region of said diaphragm, causing the central region of said diaphragm to remain planar as it moves linearly up and down under the action of the physical changes as the hinge flexes;

said diaphragm comprising three, composite layers:
a first silicon layer;
a second silicon layer; and
an intermediate layer of a material which acts as an etch stop to a silicon etching chemical; one of said silicon layers having a continuous, surrounding etched out trough forming said hinge.

2. The capacitive semiconductive sensor of claim 1, wherein:
said diaphragm is disc shaped; and wherein:
said hinge includes a continuous, circular, indented trough surrounding said central region decreasing the effective thickness of said diaphragm at said hinge.

3. The capacitive semiconductive sensor of claim 1, wherein:
the ratio of the thicknesses of said central region to said hinge is of the order of about ten to one (10:1).

4. The capacitive semiconductive sensor of claim 1, wherein there is further included:
a mesa on the interior side of said semiconductive substrate extending into said reference chamber; and wherein:
said hinge has a periphery substantially coextensive with the periphery of said mesa.

5. The capacitive semiconductive sensor of claim 1, wherein:
said trough is located on the interior side of said diaphragm, said central region extending down into said reference chamber; and wherein:
said semiconductive substrate is substantially flat across its interior surface devoid of any mesa.

6. The capacitive semiconductive sensor of claim 1, wherein:
said intermediate layer is glass.

7. The capacitive semiconductive sensor of claim 1, wherein:
said intermediate layer is aluminum.

8. The capacitive semiconductive sensor of claim 1, wherein:
the thickness of said hinge is about three mils and the thickness of said central region is about twenty-file mils.

9. A method of linearizing the frequency output of a capacitive, semiconductive-dielectric-semiconductive sensor, which sensor includes
a conductive substrate of semiconductor material;
a conductive diaphragm of semiconductor material, said diaphragm having an inner, central region and an outer area, said diaphragm being capable of flexing movement in its central region due to the action of physical changes to be senses; and a non-conductive, dielectric layer between the semiconductive substrate and the semiconductive diaphragm, said layer providing peripheral wall(s) extending between and joining said semiconductive substrate and said semiconductive diaphragm; an evacuated reference chamber being formed between said semiconductive substrate and said semiconductive diaphragm and being closed off by said peripheral wall(s) formed by said dielectric layer between said semiconductive substrate and said semiconductive diaphragm; the flexing movement of said semiconductive diaphragm due to the physical changes, causing the capacitance of the sensor to vary;

comprising the following step(s):
forming a "hinge" at the outer, peripheral area of said diaphragm by including an area surrounding said central region of substantially less thickness than the thickness of the central region of said diaphragm, causing the central region of said diaphragm to remain planar as it moves linearly up and down under the action of the physical changes as the hinge flexes;

there being included the further steps of:
forming said diaphragm from at least three composite layers, including two silicon layers and an intermediate layer of a material other than silicon which can serve as a etch stop for a chemical used to etch out silicon; and
forming said hinge in said composite layers by etching out the silicon in one of the silicon layers until the etching chemical reaches the intermediate, etch stop layer.

10. The method of claim 9, wherein there is included the following step(s):
using a diaphragm made completely of silicon and integrally forming said hinge by removing a portion of the silicon to form an indented trough in the silicon.

11. The method of claim 10, wherein there is included the following step(s):
etching out the hinge.

12. The method of claim 10, wherein there is included the following step(s):
machining out the hinge.

13. The method of claim 9, wherein there is included the following step(s):
forming the diaphragm by depositing the intermediate layer on one of the silicon layers which has the desired hinge thickness and bonding it to the second silicon layer which is thick enough to serve as the non-deflecting central region; and
etching out the silicon in the second layer in the peripheral outer areas of the hinge to form the hinge.

14. The method of claim 9, wherein there is included the following step(s):
placing said second layer on the interior side of the diaphragm extending into the reference chamber; and
using a substrate base which is substantially flat on its interior side facing into the reference cavity devoid of any mesa.

* * * * *